United States Patent
Shah

Patent Number: 6,118,039
Date of Patent: Sep. 12, 2000

[54] METHOD FOR DIGESTING A NITRO-BEARING EXPLOSIVE COMPOUND

[75] Inventor: Manish M. Shah, Richland, Wash.

[73] Assignee: Battelle Memorial Institute, Richland, Wash.

[21] Appl. No.: 09/285,488

[22] Filed: Apr. 2, 1999

Related U.S. Application Data

[63] Continuation-in-part of application No. 09/048,865, Mar. 26, 1998, abandoned.

[51] Int. Cl.[7] ........................................... A62D 3/00
[52] U.S. Cl. ........................ 588/202; 588/203; 588/205; 588/244; 588/246
[58] Field of Search .................... 423/581; 588/203, 588/202, 205, 244, 246; 204/59 R; 422/186.3; 149/105

[56] References Cited

U.S. PATENT DOCUMENTS

| | | | |
|---|---|---|---|
| 2,099,277 | 11/1937 | Peterson | 40/138 |
| 2,395,186 | 2/1946 | Jones | 72/136 |
| 4,038,116 | 7/1977 | Andrews et al. | 149/105 |
| 4,468,297 | 8/1984 | Sawyer et al. | 204/59 |
| 5,143,710 | 9/1992 | Sawyer et al. | 423/581 |
| 5,370,845 | 12/1994 | Miller et al. | 422/186.3 |
| 5,516,971 | 5/1996 | Hurley | 588/203 |
| 5,574,203 | 11/1996 | Noel et al. | 588/203 |
| 5,763,736 | 6/1998 | Daume | 588/203 |

*Primary Examiner*—Steven P. Griffin
*Assistant Examiner*—Eileen E. Nave
*Attorney, Agent, or Firm*—Paul W. Zimmerman

[57] ABSTRACT

The present invention is a process wherein superoxide radicals from superoxide salt are used to break down the explosive compounds. The process has an excellent reaction rate for degrading explosives, and operates at ambient temperature and atmospheric pressure in aqueous or non-aqueous conditions. Because the superoxide molecules are small, much smaller than an enzyme molecule for example, they can penetrate the microstructure of plastic explosives faster. The superoxide salt generates reactive hydroxyl radicals, which can destroy other organic contaminants, if necessary, along with digesting the explosive nitro-bearing compound.

6 Claims, 1 Drawing Sheet

6,118,039

METHOD FOR DIGESTING A NITRO-BEARING EXPLOSIVE COMPOUND

This application is a continuation-in-part of application Ser. No. 09/048,865, filed Mar. 26, 1998, now abandoned.

This invention was made with Government support under Contract DE-AC0676RLO1830 awarded by the U.S. Department of Energy. The Government has certain rights in the invention.

FIELD OF THE INVENTION

The present invention is a method for digesting a nitro-bearing explosive compound into a plurality of subcompounds that are not explosive.

BACKGROUND OF THE INVENTION

The problem of disposing excess, aging, unstable munitions stockpiled around the world has been handled in various ways ranging from simply ignoring them, openly burning/openly detonating (OB/OD) them, land burial, open sea disposal, and the limited conversion or sale of excess explosives for use by the mining industry. Most of these past practices are now unacceptable because of stringent environmental regulations. Specifically, burning/detonation produces airborne particulate and pollutants and releases toxic compounds. Burial that is not sealed also releases toxic compounds into soil and groundwater. Additionally, the conversion of military explosives into mining-grade explosives is expensive and only removes a small percentage of a nation's stockpile from the inventory. That is why Andrews et al. method using hydrogen peroxide requires 24 hours to degrade 100 ppm explosive and is very inefficient because of the need to generate sufficient OH to replace that which is lost prior to reaction. Even though TNT is more soluble than, say HMX and RDX (less than 2 ppm), the limited availability of generated hydroxyl radical because of its instability, Andrews et al. method is highly inefficient, extremely slow, and expensive in terms of capital equipment needs and labor.

U.S. Pat. No. 5,370,845 (Miller et al.) uses an organic solvent up to 30 wt % thereby overcoming in part the concentration limitation of U.S. Pat. No. 4,038,116, but still relies upon ultraviolet light exposure for a time from 5 to 30 minutes. This light exposure is achieved with a bank of ultraviolet lamps and a shallow stream. A free-radiacal initiator may be added to enhance the photolytic degradation. Free-radical initiators are organic peroxide, persulfate, hydrogen peroxide or ketones.

Recognizing the limitations of photolytic degradation, efforts were made to develop non-photolytic degradation of explosives as illustrated, for example in U.S. Pat. No. 5,763,736 (Daume) wherein explosive material is combined with a reaction medium that is aqueous containing a polar aliphatic non-saponifiable solvent. When a strong base is included, it is NaOH or KOH. Reaction time is 0.9 hour. A disadvantage of this method is that it is highly exothermic causing boiling of the reaction medium as the explosives are added thereto.

Hence, there is a need for a method of disposing of explosives (nitro-compounds) that has both the advantages of the photolytic and non-photolytic degradation methods without their attendant disadvantages.

SUMMARY OF THE INVENTION

The present invention is a process wherein superoxide radicals from a superoxide salt are used to break down the explosive compounds. The process has an excellent reaction rate for degrading explosives, and operates at ambient Regulators allow incineration on a case-by-case basis with limits on how much can be burned. Thus, it is not a viable option under the current regulatory environment for the volume or amount of explosive material to be disposed and is viewed by the public as an unfriendly process.

Alternative technologies are molten salt processes and supercritical water oxidation (SCWO). Molten salt is a high temperature process described in the U.S. Pat. No. 5,398,914 MOLTEN SALT PROCESS VESSEL. Supercritical water oxidation uses oxygen in water at temperature and pressure above its critical point as described in U.S. Pat. No. 5,133,877 CONVERSION OF HAZARDOUS MATERIALS USING SUPERCRITICAL WATER OXIDATION. Disadvantages of large scale (demilitarization) and small scale (local explosive threat) deployment of both the molten salt and supercritical water oxidation include high energy cost, complexity of deployment, lack of mobility and reduced operational safety.

More recently, U.S. Pat. No. 4,038,116 (Andrews et al.) discusses a method for degrading aromatic explosive solutions. The method begins with an aqueous solution of 100 ppm TNT (trinitrotoluene, a nitroaromatic explosive compound) to which is added 1 wt % acetone or hydrogen peroxide. The mixture is exposed to ultraviolet light for about 3 hours for the acetone or 24 hours for the hydrogen peroxide to eliminate the TNT. A clear disadvantage of this method is the requirement for ultraviolet light because ultraviolet light cannot penetrate deeply, thereby requiring shallow liquid stream for effective coupling of the ultraviolet light to produce the active chemical species. A further disadvantage is the limitation of dilute solutions which would be impractical for handling or disposing of large quantities of explosive material.

Andrews et al. hypothesized the possibility of the presence of a hydroxyl radical (OH·) as an active chemical species. Because OH· is known to be short-lived or unstable, the generated OH· must be very near a target molecule in order to react with the target molecule before the generated OH· degrades to water. temperature and atmospheric pressure in aqueous or non-aqueous conditions. Because the superoxide molecules are small, much smaller than an enzyme molecule for example, they can penetrate the microstructure of plastic explosives faster. This is advantageous when dealing with an explosive that cannot be physically manipulated safely, such as a terrorist bomb. The superoxide salt generates reactive hydroxyl radicals, which can destroy other organic contaminants, if necessary, along with digesting the explosive nitro-bearing compound. When a superoxide salt is used, for example sodium superoxide, the reaction products of potassium superoxide are potassium ions and water, both of which are environmentally benign substances. The superoxide process is much less expensive than competing munition destruction methods.

It is an advantage that the process of the present invention releases no air pollutants and meets the regulations of the Clean Air Act, the Resource Conservation and Recovery Act (RCRA), and the Federal Facilities Compliance Act (FFCA). It is a further advantage that the process is non-photolytic avoiding the complications of coupling light to the chemical reactants thereby permitting the present invention to be perfomed on any amount or concentration of munition by simple control of the amount of superoxide salt.

It is an object of the present invention to provide a method for digesting nitro-containing explosive compound(s) with a superoxide salt at room temperature and atmospheric pressure.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT(S)

Figure 1:
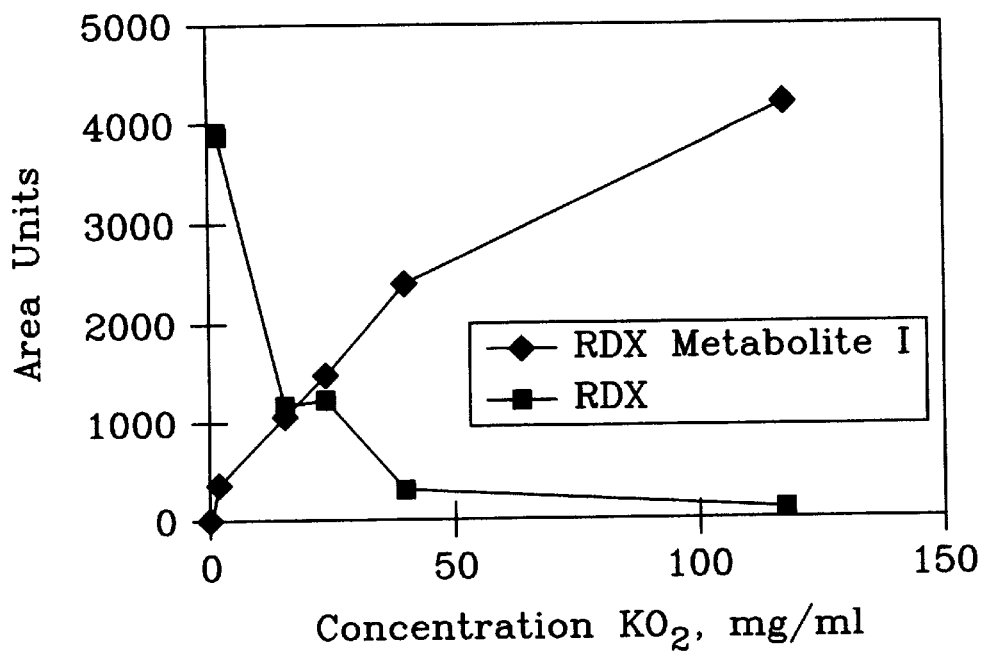
FIG. 1 is a graph of area units versus concentration for the reaction of RDX with potassium superoxide.

The present invention is a process wherein a nitro-bearing explosive compound is contacted with a superoxide salt in a solution at ambient temperature and pressure. The superoxide salt contains a superoxide radical of $O_2^-$. In general, the form of a superoxide radical depends upon the pH of the aqueous solution. When the solution pH is greater than the pKa of the superoxide, the superoxide radical is predominantly $O_2^-$, and when the solution pH is less than the pKa of the superoxide, the superoxide radical is predominantly HO. Equal amounts of the superoxide radicals are present when the solution pH is equal to the pKa of the superoxide. However, according to the present invention, the added salt form is $O_2^-$. In other words, the superoxide radical is the oxygenated anion of a salt. Cations include alkali metal cations, for example potassium, sodium and combinations thereof. Oxygenated anions include $O_2$, HO, CO, NO, SO, $SO_2$, $S_2O_5$, SeO, $SeO_2$, $CrO_2$, $UO_2$, $NpO_2$, $NO_2$, PO, VO, $PuO_2$, CIO, $CIO_2$, $CIO_3$, and combinations thereof. Preferred superoxide salts include but are not limited to potassium superoxide ($KO_2$), sodium superoxide ($NaO_2$), hydrates thereof and combinations thereof. Superoxide salts may be purchased or made as a granular solid. Alternatively, the superoxide salt may be generated in a solution electrochemically, gas plasma, corona discharge and combinations thereof.

The solution may be aqueous, non-aqueous or a combination thereof. Non-aqueous solvents include but are not limited to dimethylsulfoxide (DMSO), hexane, toluene, alcohol and combinations thereof.

The temperature may be any temperature above which freezing of the solution would occur and below which any degradation of the superoxide would occur or below which any explosive reaction would be initiated. Pressure may be any pressure, preferably above a vapor pressure of the aqueous solution to avoid boiling of the solution. In some cases, however, boiling may be desirable to promote mixing.

Reaction products are carbon dioxide, water, ammonia, nitrite, organic acid, superoxide ions and combinations thereof. When potassium superoxide is the superoxide salt, the superoxide ions are potassium ions. The superoxide generates reactive hydroxyl radicals, which can destroy other organic contaminants, if necessary, along with digesting the explosive nitro-bearing compound. The present invention has an advantage of avoiding the handling and disposal of strong bases or caustics.

Nitro-containing explosives that may be digested according to the present invention include but are not limited to RDX ($C_3H_6N_6O_6$), HMX ($C_4H_8N_8O_8$), TNT ($C_7H_5N_3O_6$), PETN ($C_5H_8N_4O_{12}$), and combinations thereof. Any of the aforementioned nitro-vearing explosives may also be combined with nitrobenzene, which is also reacted with the superoxide.

A preferred solution is one having a combination of organic solvent and water with the superoxide salt. The organic solvent dissolves the explosive permitting better chemical contact with the superoxide salt and the water dissolves the superoxide salt.

EXAMPLE 1

An experiment was conducted to demonstrate digestion of nitro-bearing explosive compounds with a superoxide according to the present invention.

A variable amount of potassium superoxide salt in water was contacted with 19.8 mg/ml of the nitro-bearing explosive compound RDX. Results are shown in FIG. 1. Digestion was observed for all concentrations of potassium superoxide salt. A mass excess of potassium superoxide salt compared to the mass of RDX provides the most complete digestion.

Figure 2:
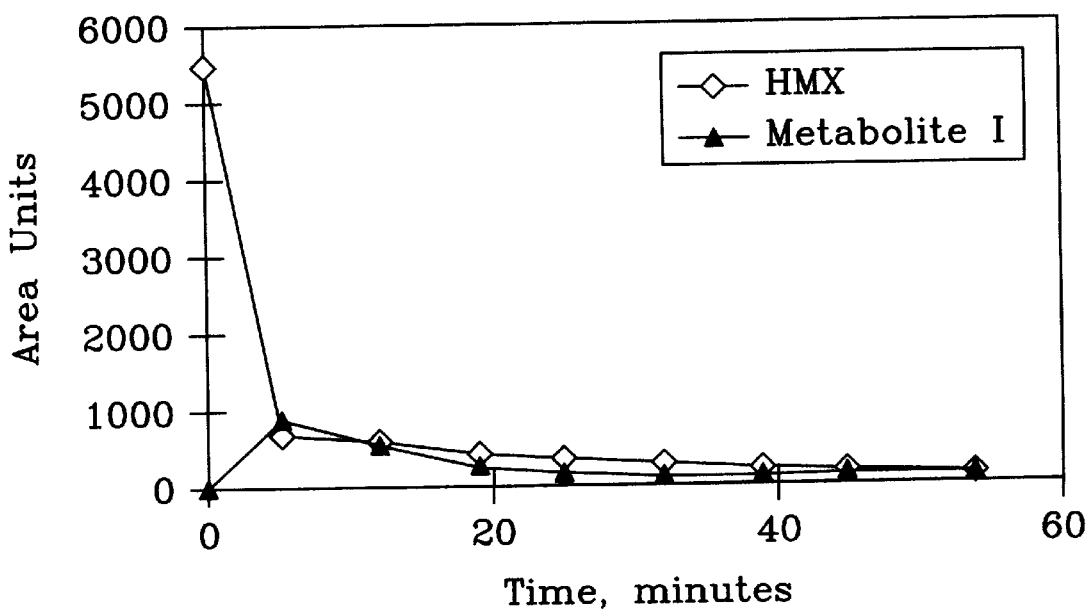
FIG. 2 is a graph of area units versus time for the reaction of HMX with potassium superoxide.

An amount of 145.0 mg/ml of potassium superoxide salt together with 50 mM acetate buffer (pH 3.5) was contacted with 0.1 mg/ml of the nitro-bearing explosive compound HMX. Results are shown in FIG. 2. A 50% reduction of HMX was observed in less than 5 minutes.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method for non-photolytically disposing of a nitro-bearing explosive compound, having the steps of:
   (a) preparing a solution containing a reactive agent;
   (b) contacting the nitro-bearing explosive compound with said solution and digesting the nitro-bearing explosive compound into a non-explosive compound;
      wherein the improvement comprises:
         said preparing is by dissolving a superoxide salt as said reactive agent into said solution.

2. The method as recited in claim 1, wherein the solution is selected from the group consisting of organic solvent, water and combinations thereof.

3. The method as recited in claim 1, wherein the non-explosive compound is selected from the group consisting of carbon dioxide, water, organic acid, nitrite, ammonia and combinations thereof.

4. The method as recited in claim 1, wherein said superoxide salt is potassium superoxide.

5. A method for disposing of a nitro-bearing explosive compound, comprising the steps of:
   contacting the nitro-bearing explosive compound with a superoxide salt in an aqueous solution containing an organic solvent and digesting the nitro-bearing explosive compound into carbon dioxide, water and ammonia.

6. The method as recited in claim 5, wherein said superoxide salt is potassium superoxide.

* * * * *